United States Patent [19]

Krinickas et al.

[11] Patent Number: 5,003,207
[45] Date of Patent: Mar. 26, 1991

[54] STATOR END WINDING COOLING ARRANGEMENT FOR A VARIABLE SPEED GENERATOR

[75] Inventors: Alexander Krinickas; David H. Hitt, both of Rockford; Val Vaghani, Belvidere, all of Ill.

[73] Assignee: Sundstrand Corporation, Rockford, Ill.

[21] Appl. No.: 428,271

[22] Filed: Oct. 26, 1989

[51] Int. Cl.$^5$ .............................................. H02K 9/00
[52] U.S. Cl. ....................................... 310/52; 310/54; 310/61; 310/184; 310/260
[58] Field of Search ................ 310/54, 58, 59, 60 R, 310/60 A, 61, 64, 65, 53, 260, 254, 270, 261, 86, 52, 184, 198

[56] References Cited

U.S. PATENT DOCUMENTS

| | | | |
|---|---|---|---|
| 3,480,810 | 11/1969 | Potter | 310/54 |
| 4,311,932 | 1/1982 | Olson | 310/61 |
| 4,350,908 | 9/1982 | Riffe | 310/61 |
| 4,496,862 | 1/1985 | Weber | 310/56 |
| 4,514,652 | 4/1985 | Olson | 310/54 |
| 4,611,137 | 9/1986 | Sutrina | 310/54 |
| 4,621,210 | 11/1986 | Krinickas | 310/61 |

FOREIGN PATENT DOCUMENTS

| | | | |
|---|---|---|---|
| 0162434 | 8/1985 | Japan | 310/54 |
| 1179484 | 9/1985 | U.S.S.R. | 310/54 |

*Primary Examiner*—R. Skudy
*Attorney, Agent, or Firm*—David H. Hitt

[57] ABSTRACT

This invention relates to a stator winding cooler for a generator having a stator, a fluid-filled rotor mounted for rotation relative thereto and a fluid supply delivering fluid to within the rotor. The stator winding cooler comprises a fluid sprayer disposed within the rotor for accepting fluid within the rotor and delivering the fluid to windings on the stator to cool the windings, the fluid sprayer having a variable orifice therein to render rates of fluid flow through the fluid sprayer insensitive to variations in rotor speed. The stator winding cooler is so designed to function in conjunction with the generator which operates at variable speed. The rate of fluid flow through the fluid sprayer is desired to be held constant to avoid over-spraying end windings at high generator speeds. In the preferred embodiment of the invention, oil, which is used as the cooling fluid, is also passed through a fixed metering orifice within the fluid sprayer which provides a maximum flow rate therethrough. The fluid sprayer is used to cool end windings on the stator of the generator, which in the preferred embodiment is a polyphase AC generator.

20 Claims, 3 Drawing Sheets

STATOR END WINDING COOLING ARRANGEMENT FOR A VARIABLE SPEED GENERATOR

TECHNICAL FIELD

This invention relates to a cooling arrangement for generators that are designed to operate at variable speed. The cooling arrangement allows consistent spray cooling of the stator end windings during operation. Consistency is achieved by providing a cooling arrangement which is insensitive to variations in the operating speed of the generator, delivering a constant volume of cooling fluid to the windings.

BACKGROUND ART

There are many cooling schemes for generator stator end windings. Most cooling schemes involve delivering cooling fluid to within a rotating rotor. The cooling fluid is used to cool windings within the rotor. The cooling fluid is then delivered to the stator end windings by means of an orifice or a simple radial passage located in the rotating rotor. Accordingly, as the rotor rotates, cooling fluid sprays from the rotor, bathing the stator end windings with cooling fluid.

U.S. Pat. No. 4,496,862, which issued on Jan. 29, 1985 to Weber and commonly assigned with the subject invention, although not directed to a stator end winding cooling scheme, nonetheless shows a typical prior art cooling scheme for stator end windings. Weber provides for generally radial passages, in alignment with end turns of a stator winding, extending from within a rotor to the periphery of the rotor. As a consequence of this construction, cooling fluid may be directed at such windings for cooling purposes.

During operation of a variable speed generator, it is desirable to maintain a steady flow of cooling fluid to the end windings. It is not desirable to have rates of flow of the fluid vary as a function of the rotor speed. Accordingly, the above-described cooling method works at its best when generator speed is constant. In fact, the generator disclosed in Weber operates at a constant speed in the preferred embodiment. If, using the Weber cooling scheme, the generator speed were to vary substantially, cooling fluid flow rates through the radial passages would vary substantially due to the widely varying fluid pressures within the rotor.

The generator within which the subject invention is intended to function normally operates at variable speeds. Accordingly, the above-described scheme of spraying stator end windings with an orifice or a simple radial passage would be inadequate to assure an unchanging rate of cooling fluid flow to the generator end windings.

Accordingly, no prior invention has ever addressed the problem of cooling stator end windings in a generator which operates at varying speeds, the object being to render rates of flow of cooling fluid to the end windings insensitive to generator rotor speed. The subject invention is the first to address the problem of variable cooling fluid flow rates within a generator operating at variable speed.

DISCLOSURE OF INVENTION

It is therefore a primary object of the invention to provide, in a dynamoelectric machine having a stator, a fluid-filled rotor mounted for rotation relative thereto and a fluid supply delivering fluid to within the rotor, a stator winding cooler comprising a fluid sprayer disposed within the rotor for accepting fluid within the rotor and delivering the fluid to windings on the stator to cool the windings, the fluid sprayer having a variable orifice therein to render rates of fluid flow through the fluid sprayer insensitive to variations in rotor speed.

Another object of the invention is to provide a fixed metering orifice in a fluid sprayer to limit rates of fluid flow through the fluid sprayer.

Still another object of the invention is to provide a fluid sprayer which delivers fluid to end windings on a stator.

A still further object of the invention is to provide a dynamoelectric machine wherein fluid in a rotor cools windings in the rotor.

Yet a further object of the invention is to provide a rotor in a dynamoelectric machine having a central fluid passage, the passage coupled to a fluid supply.

Still another object of the invention is to provide a stator winding cooler for a dynamoelectric machine wherein the cooling fluid is oil.

A final object of the invention is to provide a stator winding cooler for a dynamoelectric machine wherein the dynamoelectric machine is a polyphase AC machine.

In the attainment of the foregoing objects, the apparatus that encompasses the preferred embodiment of the invention is a generator which comprises a stator. A fluid-filled rotor is mounted for rotation relative to the stator and has an oil supply delivering oil to within the rotor. An oil sprayer is disposed within the rotor and accepts oil within the rotor, delivering the oil to end windings on the stator to cool the end windings. The oil sprayer has a variable orifice within it to render rates of oil flow through the sprayer insensitive to variations in rotor speed. A fixed metering orifice is provided in the sprayer to limit rates of oil flow through the oil sprayer. The oil in the rotor cools windings in the rotor. The rotor is also provided with a central oil passage, the passage coupled to the oil supply. Finally, the generator is a polyphase AC generator having fluid sprayers at opposite ends of the rotor.

The preferred embodiment of the invention also includes a process for cooling stator end windings, comprising the steps of accepting fluid into a fluid sprayer within a rotor and delivering the fluid from the fluid sprayer to end windings on a stator to cool the end windings. The fluid sprayer, again has a variable orifice therein to render rates of fluid flow through the fluid sprayer insensitive to variations in rotor speed.

Other objects and advantages of the present invention will be apparent upon reference to the accompanying description when taken in conjunction with the following drawings:

BEST MODE FOR CARRYING OUT INVENTION

Figure 1:
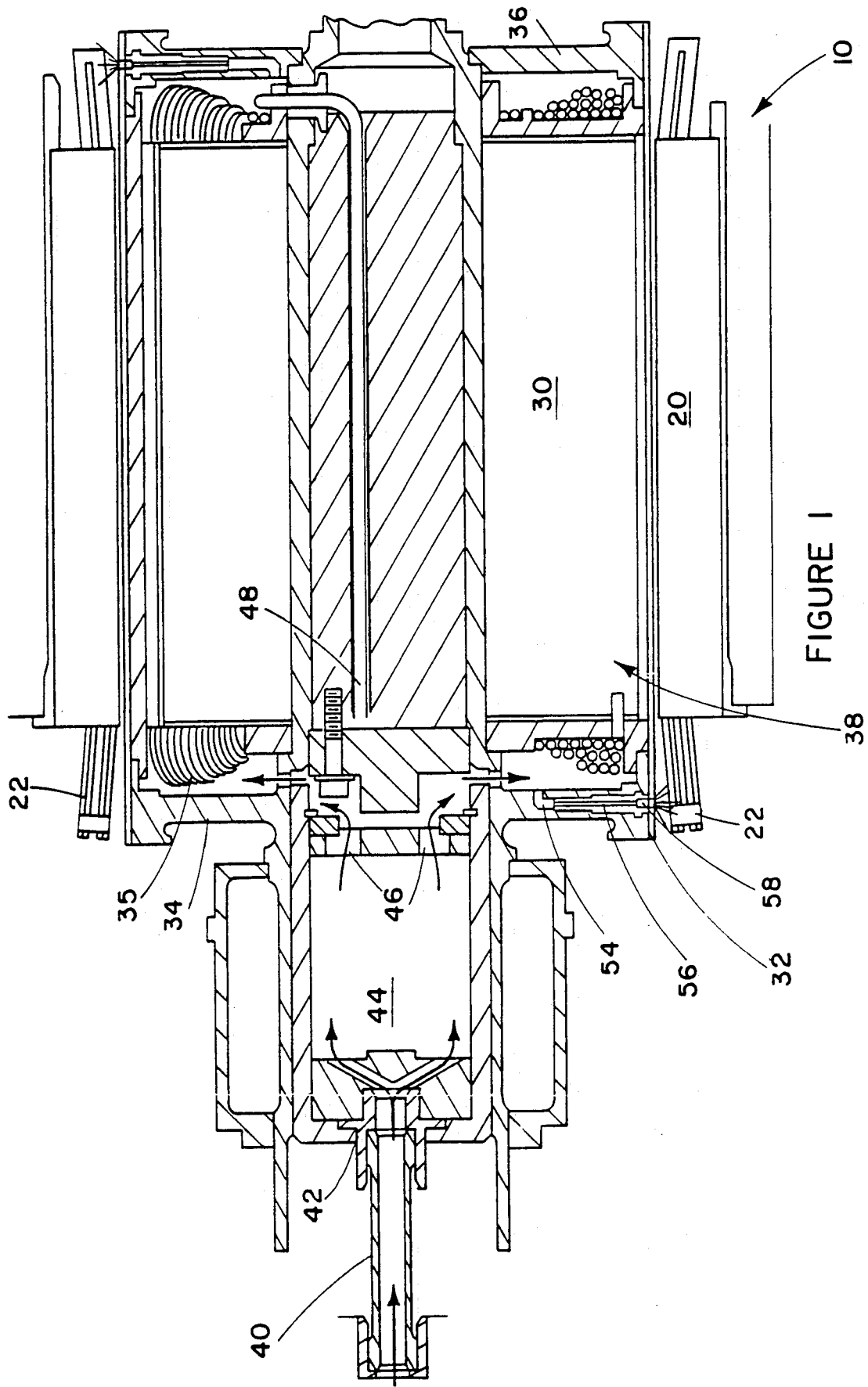
FIG. 1 is a full section view of a generator embodying the subject invention.

FIG. 1 is a full section view of a generator embodying the subject invention. The generator, indicated generally as 10, comprises a stator 20 and a rotor 30 mounted for rotation relative to the stator 20 by bearings (not shown). A fluid supply 40 delivers cooling fluid (oil, in the preferred embodiment) to the rotor 30 through a rotating fitting 42 and a central fluid passage comprising a rectifier chamber 44, transfer orifices 46 and a transfer tube 48. Cooling fluid is thereby delivered to within the rotor 30. The rotor 30 is surrounded by a rotor can 32 having end plates 34 and 36 at ends thereof.

Cooling fluid flows into and completely fills a cavity 38 and, in the process, cools rotor windings 35 during operation of the generator 10.

Fluid readily flows through an aperture 50. By virtue of centrifugal force, the cooling fluid fills a second cavity 52, further cooling rotor windings 35. Eventually, the cooling fluid enters an orifice 54 leading to a radial tube 56. The radial tube 56 exits in an end winding cooling orifice 58, allowing the cooling fluid to spray on end windings 22 located radially outward of the end winding cooling orifice 58.

Once fluid has cooled end windings 22, the fluid is eventually recirculated to the fluid supply 40 via a conventional pumping mechanism (not shown).

Figure 2:
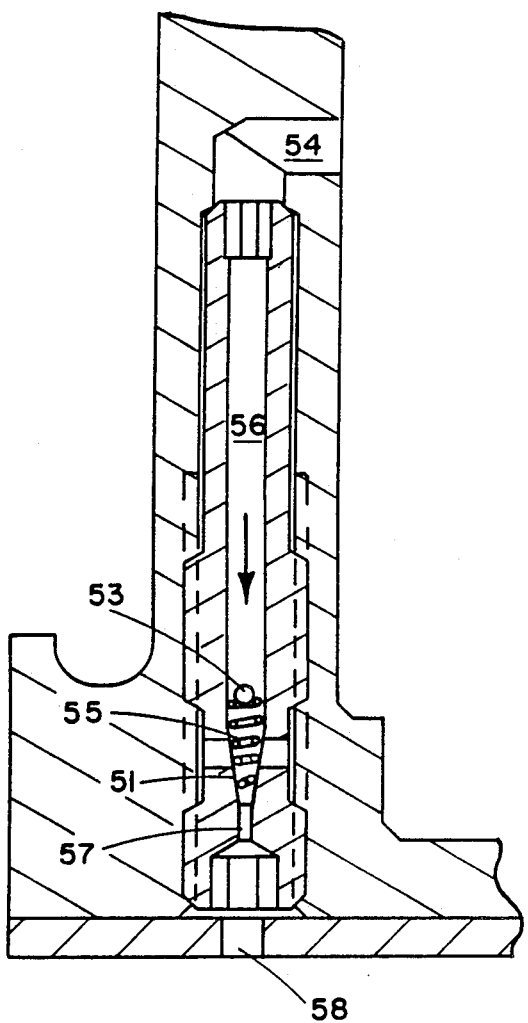
FIG. 2 is a partial section view of the rotor of the generator of FIG. 1 emphasizing an embodiment of the subject invention.

FIG. 2 is a partial section view of the rotor of the generator of FIG. 1 emphasizing an embodiment of the subject invention. FIG. 2 shows, the orifice 54, the radial tube 56 and the end winding cooling orifice 58 as shown and described in FIG. 1. FIG. 2 illustrates one embodiment of a variable orifice for limiting flow through the fluid sprayer when the generator operates at higher speeds. More particularly, FIG. 2 shows a tapered end 51 at the base of the radial tube 56. The taper of the tapered end 51 reduces the cross-section of the radial tube 56. A ball 53 is biased by a spring 55 away from the tapered end 51.

During generator operation, as cooling fluid flows through the radial tube 56, as illustrated by an arrow, the ball 53 exerts a force against the bias of the spring 55 due to centripetal acceleration and viscous and turbulent friction with the cooling fluid flowing past the ball 53 at an ever-increasing rate through the radial tube 56. As the ball 53 is urged radially outwardly, the ball 53, in combination with the taper 51, provides an ever-decreasing cross-sectional area of the radial tube 56 for fluid flow, thereby decreasing the volume of cooling fluid passing therethrough to cool the stator windings (not shown) of the generator. The spring 55 is calibrated to provide a constant flow rate once the generator has reached an operating speed which is within a desired regime of operating speeds. The spring 55 is further designed to prevent the ball 53 from completely blocking the radial tube 56 thereby preventing a discontinuation of the supply of cooling fluid to the stator end windings.

FIG. 2, in addition, shows a fixed metering orifice 57 downstream of the tapered end 51. The fixed metering orifice 57 restricts the flow of cooling fluid through the radial tube 56 to a desired maximum volume.

Figure 3:
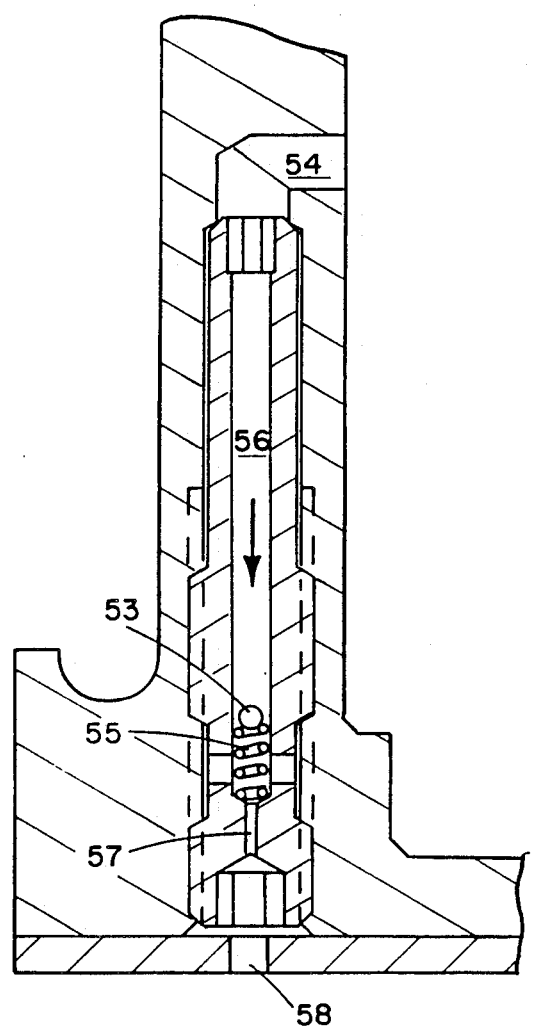
FIG. 3 is a partial section view of the rotor of the generator of FIG. 1 emphasizing an alternative embodiment of the subject invention.

FIG. 3 is a partial section view of the rotor of the generator of FIG. 1 emphasizing an alternative embodiment of the subject invention. Again, as in FIG. 2, orifice 54, radial tube 56, end winding cooling orifice 58, and fixed metering orifice 57 are shown.

However, in FIG. 3, a larger spring 55 is provided. The larger spring 55 supports a ball 53. The ball 53 is approximately the same size as the ball 53 of FIG. 2. During operation, centrifugal forces and viscous and turbulent friction act upon the ball 53 to drive the ball 53 to the periphery of the rotor of the generator. Accordingly, the ball 53 is urged against and compresses the spring 55. Cooling fluid is allowed to flow in the interstices between the coils of the spring 55. As the spring 55 is compressed, the interstices become narrower, allowing an ever-decreasing flow of cooling fluid therethrough. Again, as a corollary to the embodiment shown in FIG. 2, the spring 55 is calibrated to disallow a complete compression thereof. Accordingly, in the normal operating regime of the generator, the spring 55 will never completely compress to stop cooling fluid flow therethrough.

Although alternative embodiments of the variable orifice of the fluid sprayer have been shown, it should be obvious to one of ordinary skill in the art that other configurations to meter flow as a function of rotational velocity are possible. It should also be obvious that configurations which reduce flow as rotor speed increases are also possible.

Figure 4:
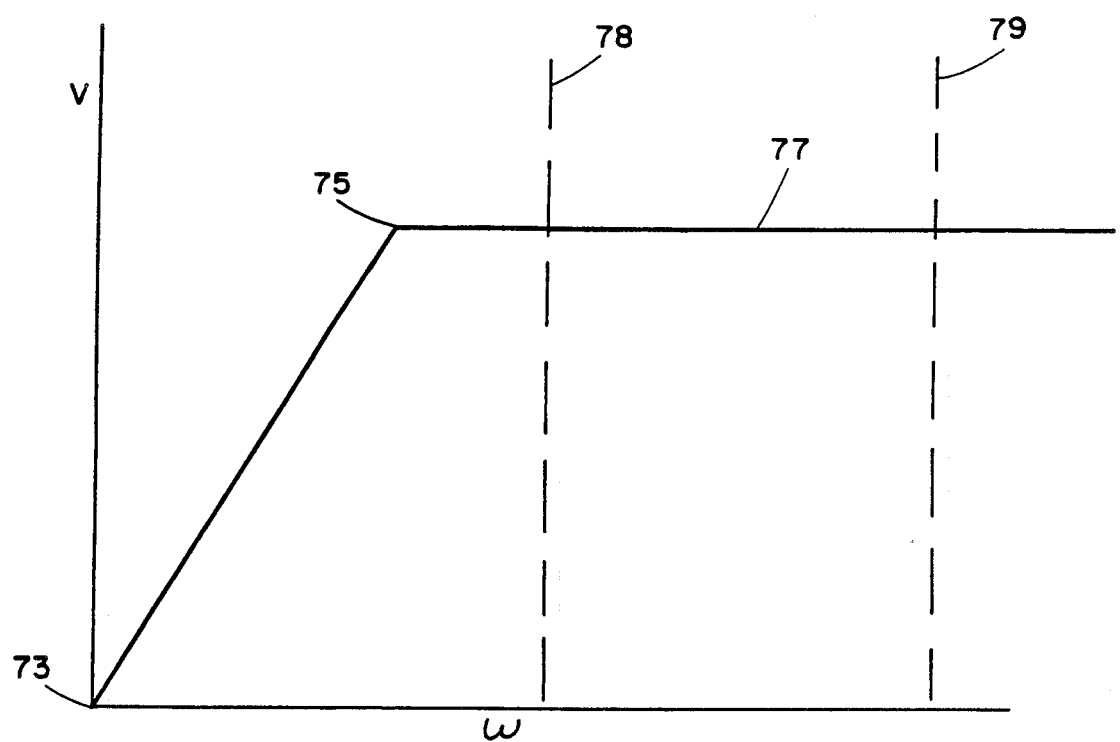
FIG. 4 graphically represents fluid sprayer volume as a function of rotor rotational speed.

FIG. 4 graphically represents the volume of fluid flowing through the fluid sprayer as a function of rotor rotational velocity. When rotor rotational velocity is zero, the volume of fluid flow through the fluid sprayer is zero, represented by a point 73 in FIG. 4. As rotational velocity increases, so does the volume of cooling fluid passing through the fluid sprayer.

The bias of the spring 55 of FIGS. 2 and 3 acts against increased centrifugal force and viscous and turbulent friction to maintain the ball 53 in a fully extended position until a velocity, represented by a point 75, is reached. At the point 75, the ball 53 of FIGS. 2 and 3 will begin to urge against the spring 55, thereby rendering the volume of cooling fluid passing through the fluid sprayer a constant as a function of rotor rotational velocity. This constant volume is represented by a flat region 77 in FIG. 4. Dotted lines 78 and 79 represent a normal operating regime in terms of rotor rotational velocity for the generator. Accordingly, it is represented that within the normal operating regime defined by dotted line 78 and 79, the volume of fluid passing through the fluid sprayer as a function of rotor rotational velocity is a constant by lying within the flat region 77 of FIG. 4.

From the foregoing description it is apparent that the invention described provides a novel stator winding cooler wherein a fluid sprayer is disposed within a rotor and accepts fluid within the rotor, delivering the fluid to end windings on a stator to cool the windings, the fluid sprayer having a variable orifice therein to render rates of fluid flow through the fluid sprayer insensitive to variations in rotor speed.

Although this invention has been illustrated and described in connection with the particular embodiments illustrated, it will be apparent to those skilled in the art that various changes may be made therein without departing from the spirit of the invention as set forth in the appended claims.

I claim:

1. In a dynamoelectric machine having a stator requiring fluid cooling, a cooling fluid-filled rotor mounted for rotation relative thereto and a cooling fluid supply delivering cooling fluid to within said rotor, a stator winding cooler, comprising:

cooling fluid spraying means disposed within said rotor for accepting fluid within said rotor and delivering said fluid to windings on said stator to cool said windings, said cooling fluid spraying means having a variable flow rate orifice therein to render rates of fluid flow through said cooling fluid spraying means insensitive to variations in rotor speed to thereby deliver a constant flow of cooling fluid to said windings independent of machine speed.

2. The machine as recited in claim 1 wherein a fixed metering orifice is provided in said cooling fluid spraying means to limit said rates of fluid flow through said cooling fluid spraying means.

3. The machine as recited in claim 2 wherein said cooling fluid spraying means delivers said cooling fluid to end windings on said stator.

4. The machine as recited in claim 3 wherein said cooling fluid in said rotor cools windings in said rotor.

5. The machine as recited in claim 4 wherein said rotor is provided with a central cooling fluid passage, said passage coupled to said cooling fluid supply.

6. The machine as recited in claim 5 wherein said cooling fluid is oil.

7. The machine as recited in claim 6 wherein said machine is a polyphase AC machine.

8. A generator comprising: a stator requiring oil spray cooling;
an oil-filled rotor mounted for rotation relative thereto;
an oil supply delivering oil to within said rotor; and
oil spraying means disposed within said rotor for accepting oil within said rotor and delivering said oil to end windings on said stator to cool said end windings, said oil spraying means having a variable flow rate orifice therein to render rates of oil flow through said oil spraying means insensitive to variations in rotor speed to thereby deliver a constant flow of oil to said end windings independent of generator speed.

9. The generator as recited in claim 8 wherein a fixed metering orifice 57 is provided in said oil spraying means to limit said rates of said oil flow through said oil spraying means.

10. The generator as recited in claim 9 wherein said oil in said rotor cools windings in said rotor.

11. The generator as recited in claim 10 wherein said rotor is provided with a central oil passage, said passage coupled to said oil supply.

12. The generator as recited in claim 11 wherein said generator is a polyphase AC generator.

13. The generator as recited in claim 12 wherein oil spraying means are provided at opposite ends of said rotor.

14. In a dynamoelectric machine having a stator requiring fluid cooling, a cooling fluid-filled rotor mounted for rotation relative thereto and a cooling fluid supply delivering fluid to within said rotor, a process for cooling stator end windings, comprising the steps of:
accepting fluid into a cooling fluid spraying means within said rotor; and
delivering said cooling from said cooling fluid spraying means to end windings on said stator to cool said end windings, said cooling fluid spraying means having a variable flow rate orifice therein to render rates of fluid flow through said cooling fluid spraying means insensitive to variations in rotor speed to thereby deliver a constant flow of cooling fluid to said end windings independent of machine speed.

15. The process as recited in claim 14 wherein a fixed metering orifice in said cooling fluid spraying means is provided to limit said rates of fluid flow through said cooling fluid spraying means.

16. The process as recited in claim 15 wherein said cooling fluid in said rotor cools windings in said rotor.

17. The process as recited in claim 16 wherein said rotor is provided with a central cooling fluid passage, said passage coupled to said cooling fluid supply.

18. The process as recited in claim 17 wherein said cooling fluid is oil.

19. The process as recited in claim 18 wherein said dynamoelectric machine is a polyphase AC generator.

20. The process as recited in claim 19 wherein said cooling fluid spraying means are provided at opposite ends of said rotor.

* * * * *